United States Patent
Cordiano

[11] 3,712,684
[45] Jan. 23, 1973

[54] HYDRAULIC BRAKE SYSTEM FOR VEHICLES

[75] Inventor: Ettore Cordiano, Turin, Italy

[73] Assignee: Fiat Societa per Azioni, Turin, Italy

[22] Filed: Feb. 4, 1971

[21] Appl. No.: 112,641

[30] Foreign Application Priority Data

Feb. 11, 1970 Italy..................67434 A/70

[52] U.S. Cl. ..................303/22 A, 188/195, 303/6 C
[51] Int. Cl. ..........................B60t 8/18, B60t 11/34
[58] Field of Search ....303/6 C, 22 A, 22 R; 188/195

[56] References Cited

UNITED STATES PATENTS

| | | | |
|---|---|---|---|
| 3,191,999 | 6/1965 | Cordiano | 303/22 R |
| 2,720,428 | 10/1955 | Erson | 303/22 R |
| 2,950,147 | 8/1960 | Neubeck | 303/22 A |
| 3,456,990 | 7/1969 | Page et al. | 303/22 A |

FOREIGN PATENTS OR APPLICATIONS 1,052,441   3/1959   Germany..................303/22 A

*Primary Examiner*—Trygve M. Blix
*Assistant Examiner*—John J. McLaughlin
*Attorney*—Sughrue, Rothwell, Mion, Zinn & Macpeak

[57] ABSTRACT

A vehicle with a hydraulic brake system and fluid levelling devices to compensate for variations in rear axle load is equipped with a pressure-reducing device to vary the braking pressure on the rear wheels. The pressure-reducing device is actuated by exerting force on a protruding stem. An actuator is provided to operate on the stem, comprising a cylinder in which two chambers are formed, each attached to a levelling device of a wheel. A rod with two piston slides sealingly in a wall dividing the chambers, projecting into both. The pistons have effective areas opposite the stem that are equal in area, so that the cumulative force of the actuating member on the stem varies with the rear axle load.

3 Claims, 4 Drawing Figures

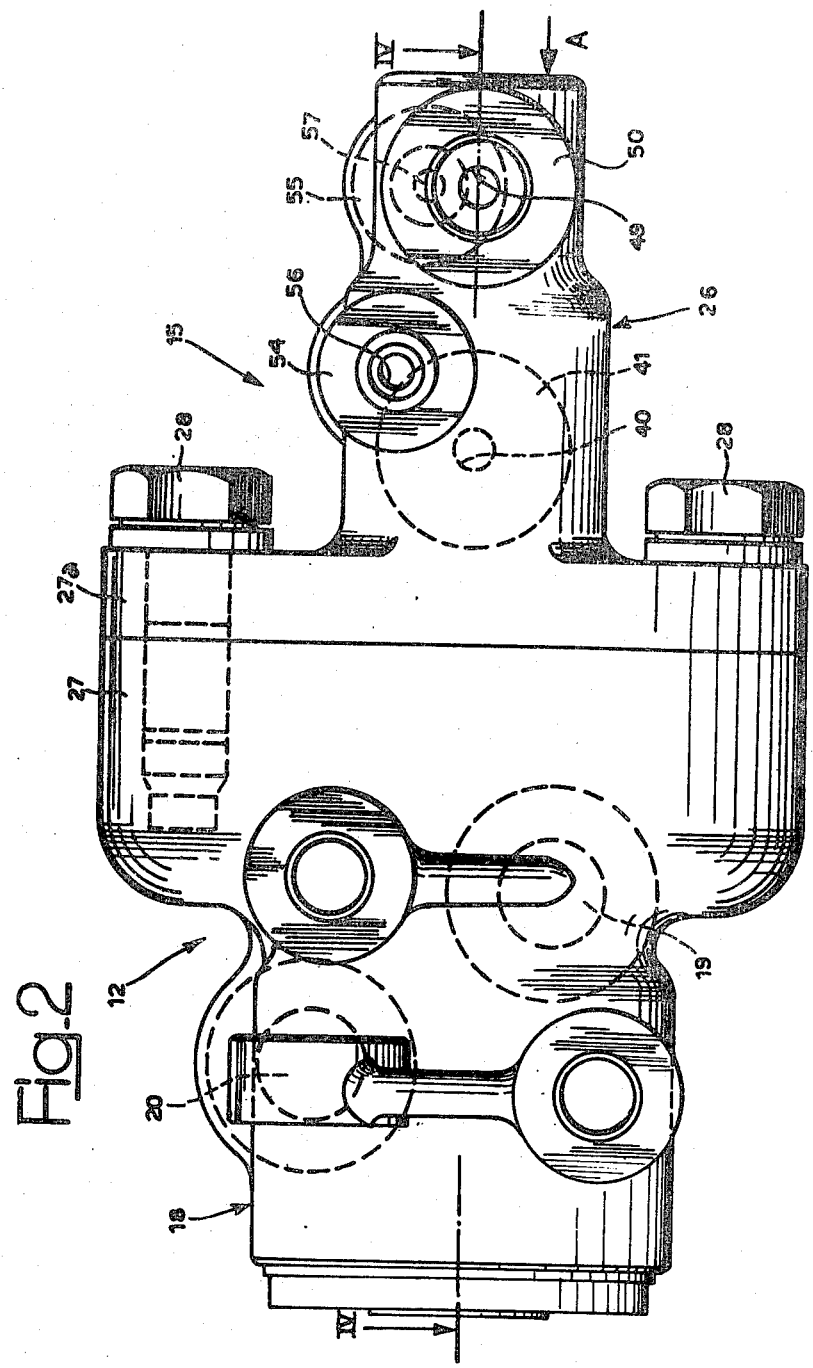

HYDRAULIC BRAKE SYSTEM FOR VEHICLES

This invention relates to hydraulic brake systems for vehicles.

Systems are known in which the braking force applied to the rear wheels of the vehicle is varied according to the load on those wheels. One such system is known from U.S. Pat. No. 3,191,999, which discloses a pressure-reducing device of known type, inserted in a hydraulic circuit connecting a master cylinder to the brakes of the rear wheels. The device is fixed to one of the parts or masses of the vehicle that is separated by a suspension system from a second vehicle part and includes a piston which is movable in the device to vary its setting. The piston is acted on by a spring extending from the second vehicle part, so that rising or lowering of the vehicle relatively to its wheels, caused by variations in load leads to variations in the forces acting on the piston in the pressure-varying device and consequently to the required variations in the pressure in the brakes of the rear wheels.

This system is obviously inapplicable in vehicles equipped with levelling devices, such as self-levelling shock absorbers, which keep the suspended part of the vehicle at a constant level on the non-suspended part, at least under static conditions, regardless of the load on the rear wheels.

Examples of known levelling devices, automatic and non-automatic, are described in the journal "Motor" (week ending 5 June 1965), in the journal "The Autocar" of 10 Mar. 1961, and also in German Pat. application P 1806938.0–21, filed on 29 Oct. 1968.

An object of the invention is to render the pressure-reducing device which is known per se and used in the system of U.S. Pat. NO. 3,191,999 capable of varying the braking force on the rear wheels of a vehicle according to the load those wheels even when the vehicle has levelling devices such as self levelling shock absorbers.

The invention provides a device for use on a vehicle having a hydraulic brake system and means to vary the braking force on the rear wheels of the vehicle according to the vehicle load, and including for each rear wheel a levelling device having a chamber containing a fluid whose pressure depends on the load on the wheel, characterized by the following combination:

a. a pressure-reducing device adapted to be secured to one of two vehicle parts separated by a suspension system, the pressure-reducing device comprising a cylinder and a piston movable therein to divide the cylinder into two chambers towards which the piston exposes faces differing in area, a first chamber towards which the piston exposes its face of greater area being adapted to be connected to the brakes of the rear wheels, the second chamber being adapted to be connected to a master cylinder of the brake system, a normally open passage controlling communication between such first and second chambers, the passage closing on displacement of the piston towards the second chamber and the piston having a stem extending through the second chamber and having a free end accessible from outside the cylinder; and b. an actuator cylinder fixed relatively to the pressure-reducing device and having a first and a second chamber each adapted to be connected to one of the levelling devices, a bore open at one end and slidably containing an operating member which contacts the free end of the stem of the piston of the pressure-reducing device, the operating member being formed with two pistons having faces opposite such stem that are equal in area, one such face being exposed to the first actuator cylinder chamber and the other to the second such chamber.

In the drawings:

FIG. 2 is an enlarged view of one detail of the system of FIG. 1;

FIG. 1 shows a complete braking system 1 fitted to a vehicle having at its rear wheels self-levelling shock absorbers 3 of known type, which each have a chamber containing a fluid whose pressure depends on the load on the wheel.

Figure 1:
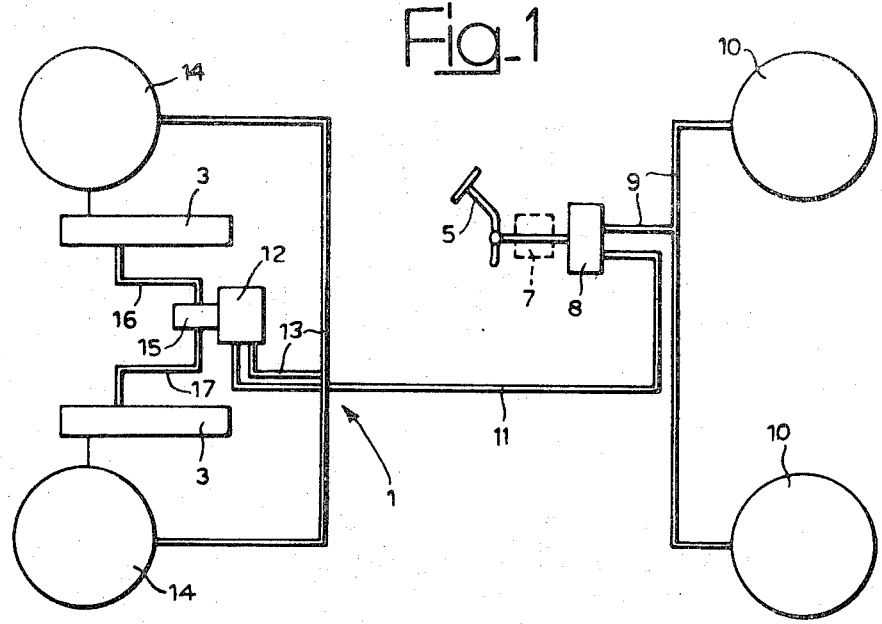
FIG. 1 illustrates diagrammatically a brake system incorporating a device according to the invention.

The braking system 1 is operated by a brake pedal 5 which actuates a master cylinder 8 directly or through a servo mechanism 7. The cylinder 8 is joined by pipes 9 to the brakes 10 of the front wheels, and by a pipe 11 to a pressure-reducing device 12 fixed to the suspended mass of the vehicle. The device 12 is connected by pipes 13 to the rear wheel brakes 14 of the vehicle.

To the pressure-reducing device 12 there is integrally joined an actuator cylinder 15 which is hydraulically connected by pipes 16 and 17 to the self-levelling shock absorbers 3.

Figure 3:
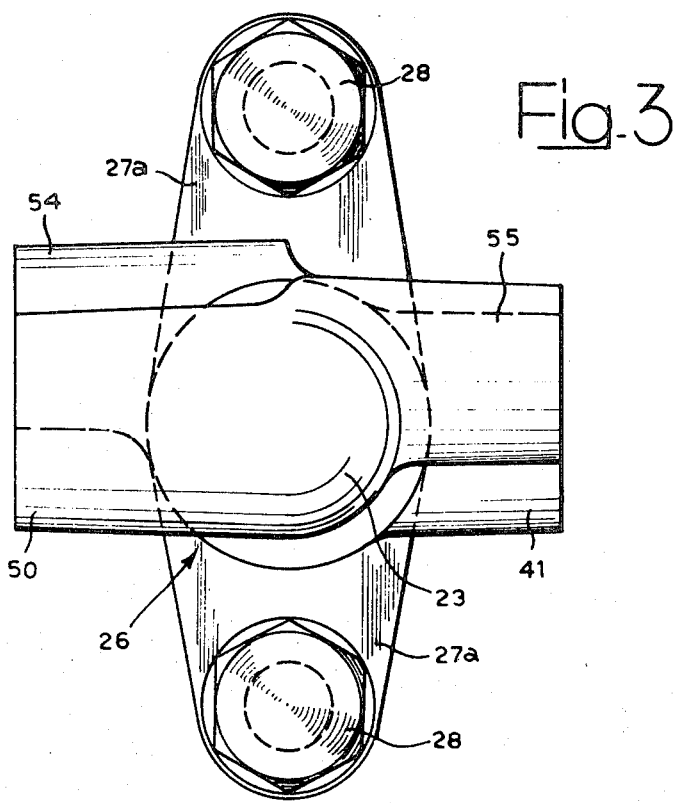
FIG. 3 is an end view taken on the arrow A of FIG. 2.
Figure 4:
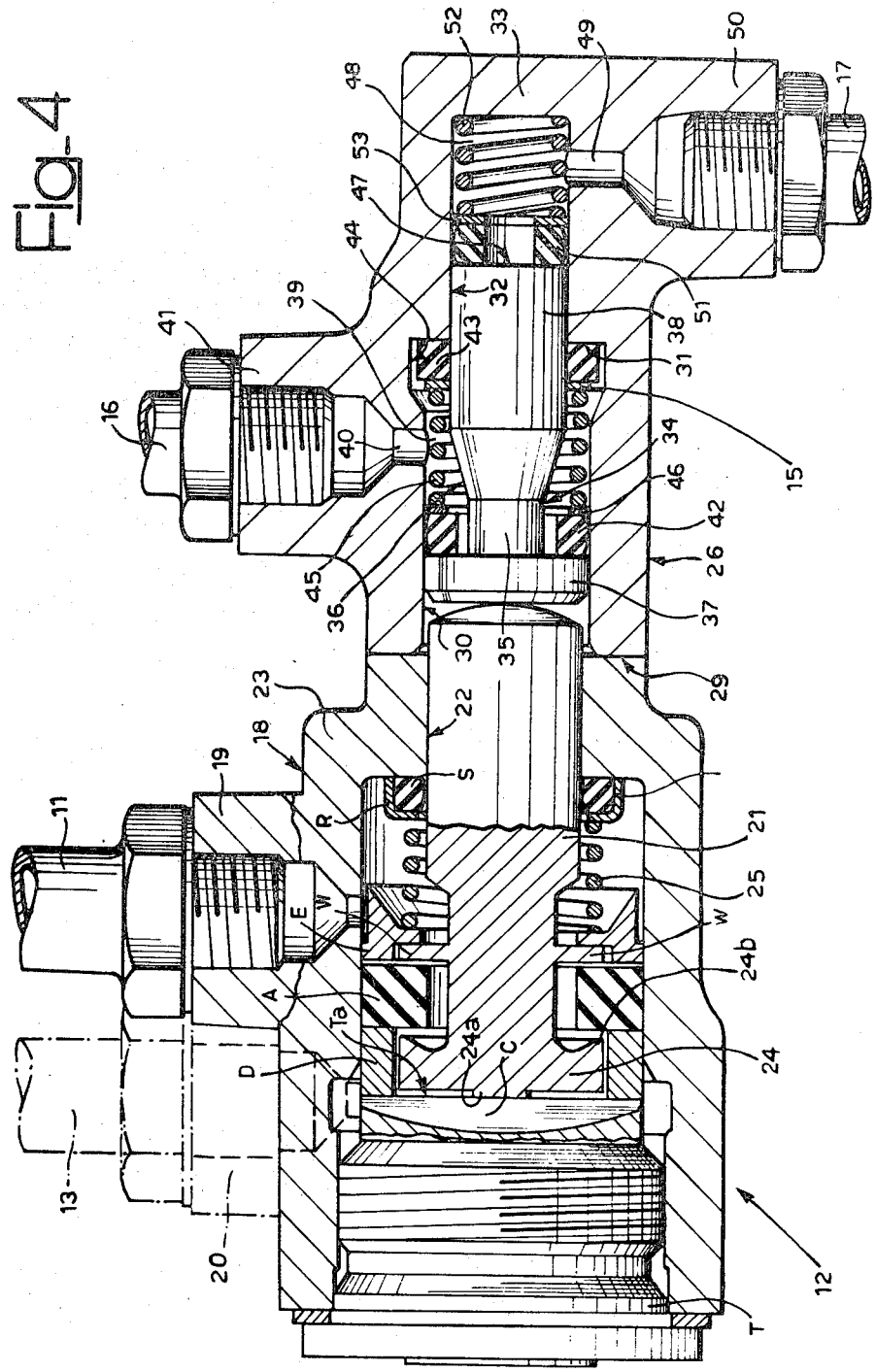
FIG. 4 is a section along line IV — IV of FIG. 2.

In FIGS. 2, 3 and 4 there is shown the entire assembly of the pressure-reducing device 12 and the actuator cylinder 15, which acts as a hydraulic control device for the pressure-reducing device 12.

In these figures, 18 indicates a cylinder making up the external shell of the pressure-reducing device 12, which is of a known type, described in Italian Pat. 841,315 and in the corresponding U.S. Pat. No. application, Ser. No. 841,525, filed on 14 July 1969 new U.S. Pat. No. 3,635,241. The cylinder 18 has two external connectors 19 and 20 which connect its cavity, which is closed at one end by a plug T, to the pipes 11 and 13 respectively.

Within the cylinder 18 there slides a piston comprising a rod 21 sealed within a bore 22 formed in an end wall 23 of the cylinder 18 opposite the plug T.

At its end opposite that mounted slidably in the bore 22, the rod 21 carries a head 24 and, at a certain distance from such head, four radial wings W spaced apart by 90° from each other and of which only two are visible in FIG. 4. A relatively weak coil spring 25 acts on these wings through an annular element E that is slidable in the cavity of the cylinder. The other end of the spring 25 bears against a washer R which has the function of holding in place a seal S which governs the slidable sealing of the rod 21 in the bore 22.

When there is no pressure in the master cylinder 8, the force of the spring 25 keeps the piston 21 in a position in which a central projection 24a of the head 24 is supported against a face Ta of the plug T that is provided with a diametral slit C. Adjacent the face Ta is a spacer ring D pressed without clearance in to the cavity of the cylinder 18. The internal diameter and the axial length of the spacer ring D are greater than the external diameter and the total axial length of the head 24 and projection 24a. The head 24 has on its face directed towards the wall 23 a peripheral lip 24b adapted to cooperate with an annular seat formed by an annular seal A of elastic material, such as rubber, inserted sealingly but slidably in the cavity of the cylinder 18 and having an axial length less than the distance which separates the wings W from the spacer ring D, when the components of the pressure reducer are in the rest position illustrated in FIG. 4, in which the piston 21 rests against the plug T. There is a gap between the inner cylindrical surface of the seal A and the surface of the rod 21.

As is seen in FIG. 4, a passage exists in the rest position of the device for the flow of fluid from the pipe 11 over the annular element E and wings W, between the seal A and rod 21 and head 24, and between the head 24, spacer D and plug T. Fluid may traverse this passage to enter the pipe 13.

Naturally the pressure reducer could also have a structure different from that illustrated, such as the structure described in the above-mentioned U.S. Pat. No. 3,191,999 or that described in Italian Pat. 844,246 (to which corresponds U.S. Pat. application, Ser. No. 840,348, filed 9 July 1969, now U.S. Pat. No. 3,597,009).

The actuator cylinder 15 is made up of a cylindrical casing 26 arranged coaxially with the cylinder 18 and removably joined to it by juxtaposed flanges 27 and 27a (FIG. 2) connected by bolts 28. The cylindrical casing 26 has an end face 29 (FIG. 4) which is held in contact with a corresponding end face of the wall 23 of the cylinder 18.

A cylindrical bore 30 extends coaxially within the casing 26 and is open at its end face 29. The bore 30 is about half as long as the cylindrical casing 26, and has an end surface 31 with which a second cylindrical bore 32, coaxial with the bore 30, communicates. The bore 32 has a smaller cross-section than the bore 30 and is closed at its outer end by an integral end wall 33 of the cylindrical casing 26.

An operating member of the actuator cylinder 15, in the form of a rod 34, slides sealingly in the casing 26. This rod 34 has a cylindrical portion 35 and a frustoconical portion 36 coaxial with the cylindrical portion 35 and meeting the latter of its end of smaller diameter. The rod 34 is arranged coaxially with the bore 30 and has joined to it at the free end of the cylindrical portion 35, a piston 37 consisting of a cylindrical head.

The piston 37 slides in the bore 30. Its end face opposite the cylindrical portion 35 contacts the adjacent end of the rod 21 which projects from the bore 22 and extends partly into the bore 30.

The rod 23 is joined, at the end of greater diameter of the frusto-conical portion 36, to a second cylindrical piston 38 which slides in the bore 32 and projects, in any of its operating positions, into the bore 30.

The annular rear face of the piston 37 and the adjoining cylindrical portion 35 together with the rod 34, the internal surface of the bore 30, and the annular bottom surface 31 thereof, define an annular chamber 39. The chamber 39 is connected by a radial cylindrical hole 40 to a threaded connection 41, to which is joined the pipe 16 leading to one of the self-levelling shock absorbers 3.

Sealing between the piston 37 and the bore 30 is ensured by an annular elastic packing 42, placed in contact with the annular rear face of the piston 37. The packing 42 has an outwardly convex outer surface in cross-sectional profile, in direct contact with the surface of the bore 30.

Between the inner surface of the packing 42 and the surface of the cylindrical portion 35 of the rod 34 there is an annular space closed at one axial end by the piston 37.

Fluid under pressure supplied to the inside of the chamber 39 acts in one direction upon the annular rear face of the piston 37, and in the opposite direction upon the surface of the frustoconical portion 36 of the rod 34. Consequently, the effective surface of the piston 37 has an area equal to the difference between the transverse cross-sectional areas of the bores 30 and 32.

Sealing at the end surface 31 of the bore 30 is ensured by an annular packing 43, placed in contact with the surface 31 of the bore 30 and assembled with clearance inside an annular groove 44 formed on the internal surface of the bore 30 adjoining the end surface 31.

A helical spring 45 surrounds the rod 34 and the piston 38 to keep the packings 42 and 43 in contact respectively with the piston 37 and the end surface 31 of the bore 30. Between the spring 45 and the packings 42 and 43 are placed washers 46.

The piston 38 has a flat end face 47 which defines, together with the internal surface of the bore 32 and the end surface of the latter, a chamber 48. The chamber 48 communicates, by way of a cylindrical hole 49 and a threaded connector 50, with the pipe 17.

Sealing between the piston 38 and the surface of the bore 32 is ensured by an annular elastic packing 51 located within the chamber 48. The packing 51 has an outwardly convex surface in direct contact with the bore 32.

The packing 51 is kept in contact with the end face 47 of the piston 38 by a helical spring 52 interposed between the end wall 33 and the packing 51, and acting through a washer 53 on the packing. The packings 43 and 51 may alternatively be replaced by toroidal packings of the "O Ring" type, or the like, arranged in circumferential grooves on the shank of the piston 38.

The end face 47 of the piston 38 constitutes the effective surface of this piston, that is, the surface subjected to the action of fluid present in the chamber 48. The face 47 has an area equal to that of the effective area of the piston 37. The effective surfaces of the pistons 37 and 38 are therefore of equal area.

The cylindrical casing 26 has on its outside two threaded connectors 54 and 55 (FIG. 2) through which cylindrical pipes 56 and 57 enter the casing. The pipe 56 opens into the chamber 39 at a point between the hole 40 and the end surface 31 of the bore 30.

The pipe 57 opens into the chamber 48 between the hole 49 and the end surface of the bore 32.

The pipes 56 and 57 and the threaded connectors 54 and 55 put the chambers 39 and 48 in communication with bleed pipes, not shown.

The system operates as follows.

When a motor vehicle has a suspension system with levelling devices, there exists an exact relationship between the oil pressure in such devices and the load on the associated vehicle axle.

At constant speed, or when the vehicle is stationary, an increase in the axle load causes a corresponding increase in the shock-absorber pressure and *vice versa*, without any accompanying variation in the level of the vehicle. During dynamic rebounds, the change of pressure in the levelling devices 3 is moreover related, according to a known rule, to the load variation.

When the pressure in the self-levelling shock absorbers 3 increases, the pressure in the chambers 39 and 48 increases correspondingly. The fluid under pressure acting on the effective surfaces of the pistons 37 and 38 thrusts the rod 34 towards the left, as viewed in FIG. 4. Since the piston 37 is in contact with an end of the rod 21 of the pressure-reducing device 12, the rod 21 and with it the head 24 are subjected to a force pushing them towards the plug T. The rod 34 therefore acts upon the rod 21 in the same direction as the spring 25.

This force is such as to keep open the communication between the pipes 11 and 13 and to delay the coming into operation of the pressure-reducing device 12 by a factor related to the load upon the rear wheels.

When braking takes place, the pressure in the pipe 11 increases and fluid enters the cavity of the cylinder 18. It traverses the passage described earlier to enter the pipe 13 and thus apply pressure to the rear brakes. The rise in pressure in the cavity tends to move the rod 21 to the right as viewed in FIG. 4. This movement is opposed by the spring 25, and by the force exerted on the rod 21 by the piston 37 as a result of the load on the rear wheels and of the springs 45 and 52 in the actuator cylinder 15.

When the pressure in the cavity of the cylinder 18 (and in the pipe 13 and brakes 14) rises sufficiently high to overcome the combined forces of the spring 25 and the piston 37, then the rod 21 moves to the right (as viewed in FIG. 4) towards the seal A to restrict the passage. Eventually the lip 24b bears fully against the seal A to close the passage. Communication ceases between the pipes 11 and 13. This will occur progressively later in the braking operation with progressive increase in the load on the rear wheels and consequently progressively greater pressure in the chambers 39 and 48.

If the pressure in the pipe 11 increases still further, there is also an increase in the pressure in the pipe 13 although at a lower rate.

When braking ceases, the pressure in the cavity of the cylinder 18 to the right of the seal A (as viewed in FIG. 4) falls rapidly. Because of the pressure differential across it, the seal A detaches itself from the head 24 and moves to the right to re-open the passage through the cavity of the cylinder 18, allowing fluid to return from the pipe 13 to the pipe 11. The rod 21 correspondingly returns to its original position under the influence of the spring 25 and the piston 37.

In the actuator cylinder 15 which has been described, the effective surface areas of the pistons 37 and 38 are, as stated previously, equal. Consequently the assembly made up of the pressure-reducing device 12 and the actuator cylinder 15 responds to the total load on the rear axle independently of possible inequalities such as caused by uneven ground in the distribution of the load between the two rear wheels.

What I claim is:

1. A device for use on a vehicle having a hydraulic brake system and means to vary the braking force on the rear wheels of the vehicle according to the vehicle load, and including for each rear wheel a levelling device having a chamber containing a fluid whose pressure depends on the load on the wheel, characterized by the following combination:

a. a pressure-reducing device adapted to be secured to one of two vehicle parts separated by a suspension system, the pressure-reducing device comprising a cylinder and a piston movable therein to divide the cylinder into two chambers towards which the piston exposes faces differing in area, a first chamber towards which the piston exposes its face of greater area being adapted to be connected to the brakes of the rear wheels, the second chamber being adapted to be connected to a master cylinder of the brake system, a normally open passage controlling communication between such first and second chambers, the passage closing on displacement of the piston towards the second chamber and the piston having a stem extending through the second chamber and having a free end projecting outwardly of the cylinder; and b. an actuator cylinder fixed relatively to the pressure-reducing device and having a first and a second chamber each adapted to be connected to one of the levelling devices, a bore open at one end to receive the said free end of the stem of the piston of the pressure reducing device and slidably containing an operating member coaxially aligned with said stem and in contact with the free end thereof, the operating member being formed with two pistons having faces opposite such stem that are equal in area, one such face being exposed to the first actuator cylinder chamber and the other to the second such chamber.

2. A device according to claim 1, in which the actuator cylinder includes spring means arranged to keep the operating member in contact with the stem of the piston of the pressure-reducing device.

3. A device according to claim 1, in which the operating member of the actuator cylinder comprises a first piston contacting the stem of the piston of the pressure-reducing device, a cylindrical portion adjoining such first piston, a frusto-conical portion with its end of lesser diameter joined to such cylindrical portion, and a second piston adjoining the end of greater diameter of the frusto-conical portion, the second piston being accommodated sealingly in a bore of which a portion forms the second chamber of the actuator cylinder.

* * * * *